(No Model.) 2 Sheets—Sheet 1.
E. B. POWERS.
LUGGAGE CARRIER FOR BICYCLES.

No. 539,486. Patented May 21, 1895.

WITNESSES
William Maynadier
John R. Snow.

INVENTOR
Edward Bates Powers,
by his attorney,
J. E. Maynadier (No Model.) 2 Sheets—Sheet 2.

E. B. POWERS.
LUGGAGE CARRIER FOR BICYCLES.

No. 539,486. Patented May 21, 1895.

Witnesses
William Maynadier
John R. Snow

Inventor
Edward Bates Powers,
by his attorney,
J. E. Maynadier

UNITED STATES PATENT OFFICE.

EDWARD B. POWERS, OF TAUNTON, MASSACHUSETTS.

LUGGAGE-CARRIER FOR BICYCLES.

SPECIFICATION forming part of Letters Patent No. 539,486, dated May 21, 1895.

Application filed September 20, 1894. Serial No. 523,563. (No model.)

*To all whom it may concern:*

Be it known that I, EDWARD BATES POWERS, of Taunton, in the county of Bristol and State of Massachusetts, have invented a new and useful Luggage-Carrier for Bicycles, of which the following is a specification, reference being had to the accompanying drawings, in which—

Figure 1:
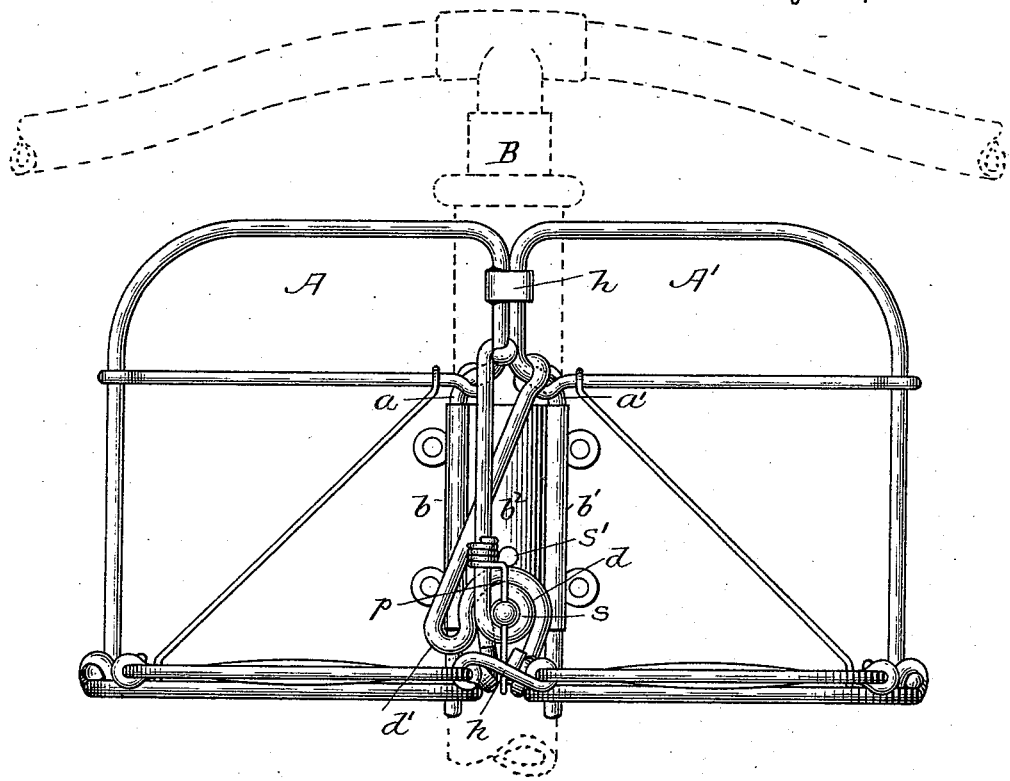
Figure 2:
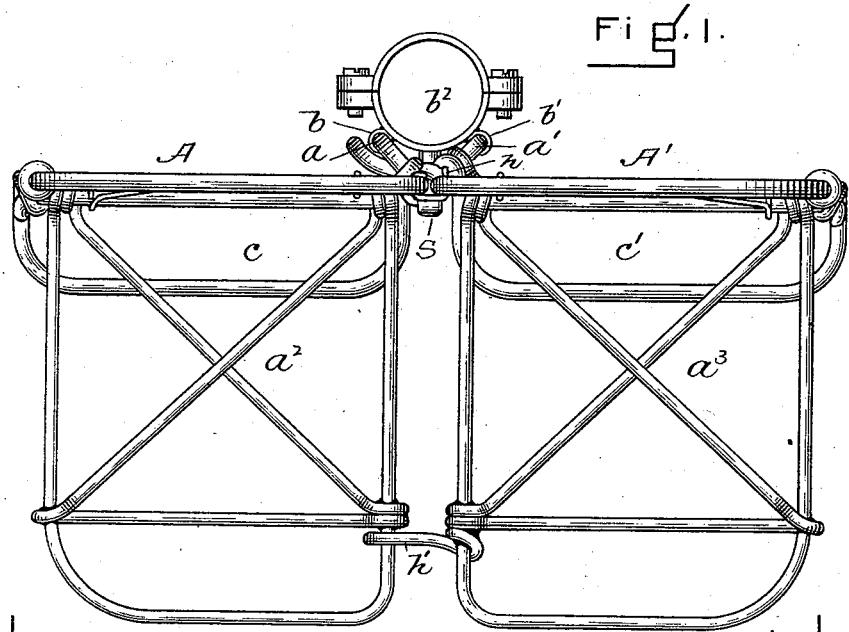
Figure 3:
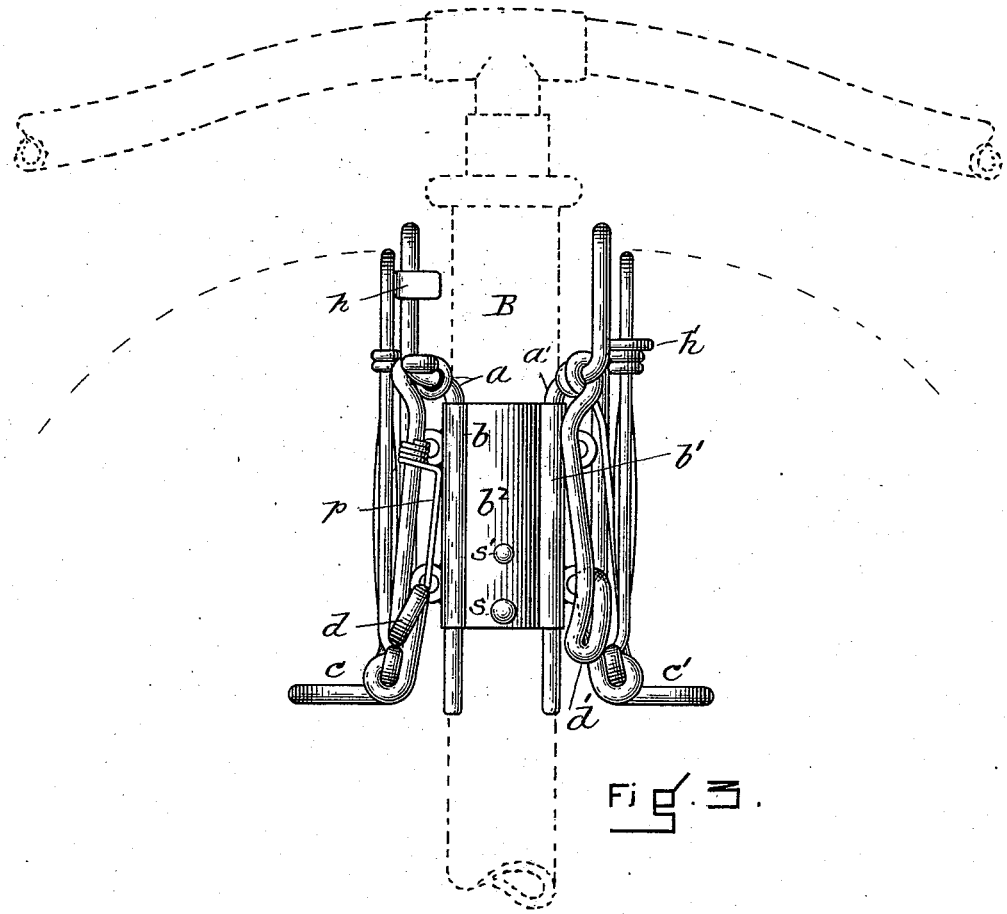
Figure 4:
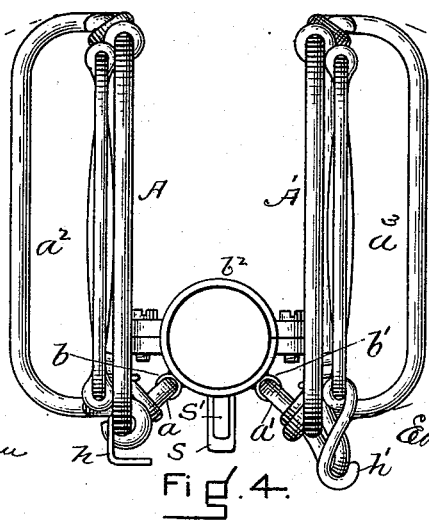

Figure 1 is a front elevation showing my carrier ready for use. Fig. 2 is a plan of Fig. 1. Fig. 3 is a front elevation showing my carrier folded back out of use. Fig. 4 is a plan of Fig. 3.

The object of my invention is to make a luggage carrier which can be folded back out of the way when not in use.

A second object of my invention is to make a luggage carrier which will be easily attachable to or detachable from the bicycle.

In the preferred form shown in the drawings my invention is embodied in a frame of wire or other suitable material provided with a tang to engage with a socket fast to the head of the bicycle (or vice versa) and two such frames each with its tang and socket permit each frame to be folded back as shown in Figs. 3 and 4; but I do not wish to limit myself to the tang and socket fastening as it is obvious that the two frames may be attached to the bicycle head in many other ways; the main object being to make a luggage carrier which will fold, as shown, out of the way when not in use.

In the drawings A A' are the two frames which when in use are connected in such fashion as to be in effect one frame which is held to the head B of the bicycle by the tangs $a\,a'$ and the sockets $b\,b'$, which sockets as shown in the drawings are secured to the clamping sleeve $b^2$ but which may obviously be brazed or otherwise secured to the head B of the bicycle. Loops $d\,d'$ in the wire forming the frame A A' pass over a stud $s$ fast to the clamping sleeve $b^2$ and a pin $p$ sliding on frame A passes through a hole in the end of stud $s$, holding the loops in place after they have been turned over the stud. A hook $h'$ at the top of frame A engages with the top of frame A' and hook $h'$, loops $d\,d'$, stud $s$ and pin $p$ make the two frames practically one. I prefer to attach a folding shelf shown in two parts $a^2\,a^3$ to the frames A A', but the straps which are used to secure the luggage to the carrier may take the place of the shelves. The shelves $a^2\,a^3$ are hinged to the bottom of frames A A' and a part $c\,c'$ projecting at the bottom of A A' supports $a^2\,a^3$ at the desired angle with A A' when the shelves $a^2\,a^3$ are down. Hook $h$ connects the shelves when ready for use.

I have described my invention as attachable and detachable, but it is obvious that it may be made fast to frame B of the bicycle, the main object being to make a frame which will fold into a small space when not in use. It is obvious also that the tangs and sockets may be made non-circular and that the frames by this construction may be held in position across the head ready for use or folded back.

The operation is as follows: Tang $a$ in socket $b$ and tang $a'$ in socket $b'$ permit the frames to turn freely either across the front of the bicycle or backward upon either side, and the frames be secured when turned back by a strap or a catch. When the frames stand across the head hook $h$ upon the upper part of frame A will engage the upper part of frame A', and loops $d\,d'$ upon frames A A' respectively will pass over stud $s$. The pin $p$ is then pushed down through the hole in the end of stud $s$. The shelves $a^2\,a^3$ are then let down and are fastened together by the hook $h$. The stud $s'$ serves to keep loop $d'$ in place. When the carrier is to be folded the hooks $h\,h'$ are unfastened, the pin $p$ withdrawn and the frames folded back as shown.

What I claim as my invention is—

1. In a luggage carrier for bicycles, the combination of two frames; two vertical tangs; and two vertical sockets attached to the steering head; all arranged to permit the two frames to be attached and detached and to be placed side by side when not in use and in line in front of the steering head when in use, all substantially as shown and described.

2. In a luggage carrier for bicycles the combination of two frames A A'; two shelves $a^2\,a^3$, one forming part of frame A, the other part of frame A'; supports $c\,c'$ for the shelves $a^2\,a^3$, and means for connecting the frames to a bicycle head either in line across the front of the head, or side by side, all substantially as shown.

3. In a luggage carrier for bicycles two frames each of bent wire, in combination with two sockets, in each of which one portion of the wire forms a pintle, by which the frames are respectively hinged to the bicycle head, and adapted to be brought in line for use as a carrier, and side by side when not so used; all substantially as set forth.

EDWARD B. POWERS.

Witnesses:
J. E. MAYNADIER,
H. S. HACK.